United States Patent
Menon

(10) Patent No.: US 11,706,185 B2
(45) Date of Patent: Jul. 18, 2023

(54) ADDRESS RESOLUTION PROTOCOL (ARP) RESPONSE TO ARP REQUESTS

(71) Applicant: Juniper Networks, Inc., Sunnyvale, CA (US)

(72) Inventor: Abilash Menon, Boxborough, MA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 17/649,634

(22) Filed: Feb. 1, 2022

(65) Prior Publication Data

US 2023/0136743 A1    May 4, 2023

Related U.S. Application Data

(60) Provisional application No. 63/263,264, filed on Oct. 29, 2021.

(51) Int. Cl.
| | | |
|---|---|---|
| *G06F 15/16* | (2006.01) | |
| *H04L 61/103* | (2022.01) | |
| *H04L 12/46* | (2006.01) | |

(52) U.S. Cl.
CPC ........ *H04L 61/103* (2013.01); *H04L 12/4641* (2013.01)

(58) Field of Classification Search
CPC .......................... H04L 12/4641; H04L 61/103
USPC ........................................................ 709/227
See application file for complete search history.

(56) References Cited

U.S. PATENT DOCUMENTS

| | | | |
|---|---|---|---|
| 2014/0369183 A1* | 12/2014 | Chiang | G06F 11/2002 370/219 |
| 2021/0409323 A1 | 12/2021 | Menon et al. | |
| 2022/0206908 A1* | 6/2022 | Brar | G06F 11/0712 |

FOREIGN PATENT DOCUMENTS

EP          1294137 A1 *   3/2003    ....... H04L 29/12009

OTHER PUBLICATIONS

Brown, "Guide to IP Layer Network Administration with Linux", Apr. 2003, pp. 1-179, Retrieved from from URL: http://linux-ip.net/linux-ip.pdf.
Extended Search Report from counterpart European Application No. 22165909.7 dated Sep. 23, 2022, 10 pp.
Lasserre et al., "Virtual Private LAN Service (VPLS) Using Label Distribution Protocol (LDP) Signaling", Network Working Group rfc4762.txt, Jan. 2007, 31 pp.
Stevens, "ARP: Address Resolution Protocol", vol. 01, The Protocols [Professional Computing Series], Jan. 1994, pp. 53-68.

* cited by examiner

*Primary Examiner* — Hee Soo Kim
(74) *Attorney, Agent, or Firm* — Shumaker & Sieffert, P.A.

(57) ABSTRACT

Techniques are disclosed for avoiding sending network traffic through a backup network device when an active network device is operational. An example device is configured to receive a first address resolution protocol (ARP) request from an active network device and a second ARP request from a backup network device. The device is also configured to, in response to receiving the first ARP request and the second ARP request, send a first ARP response to the active network device.

18 Claims, 3 Drawing Sheets

ADDRESS RESOLUTION PROTOCOL (ARP) RESPONSE TO ARP REQUESTS

This application claims the benefit of U.S. Provisional Patent Application No. 63/263,264, entitled "ETHERNET OVER SECURE VECTOR ROUTING HIGH AVAILABILITY POINT TO POINT CONNECTIVITY" and filed on Oct. 29, 2021, the entire contents of which is incorporated herein by reference.

TECHNICAL FIELD

This disclosure generally relates to computer networks, and, more specifically, routing packets within computer networks.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. A session may be unidirectional in that the session includes packets traveling in only one direction from a first device to a second device. For example, a session includes a forward packet flow originating from a first device and destinated for a second device. A different session may include a reverse packet flow originating from the second device and destined for the first device.

Alternatively, a session may be bidirectional in that the session includes packets traveling in both directions between a first device and a second device. For example, a session includes a forward packet flow originating from a first device and destinated for a second device and a reverse packet flow originating from the second device and destined for the first device. The forward and reverse packet flows of the session are related to one another in that the source address and source port of the forward packet flow is the same as the destination address and destination port of the reverse packet flow, and the destination address and destination port of the forward packet flow is the same as the source address and source port of the reverse packet flow. To establish a session, computing devices may use one or more communication session protocols including Transmission Control Protocol (TCP), Transport Layer Security (TLS), User Datagram Protocol (UDP), Internet Control Message Protocol (ICMP), etc.

SUMMARY

In a traditional network system, when an originating router of a virtual local area network sends an Address Resolution Protocol (ARP) request to an active or primary router and a backup router, the active or primary router and the backup or secondary router both forward the ARP requests to a destination router. The destination router, in turn, may send an ARP response to each of the ARP requests. This may result in the ARP response to the ARP request from the backup router arriving at the originating router after the ARP response to the ARP request from the active router. The originating router may then update the routing table of the originating router with the network address of the backup router. The originating router may then send network traffic bound for the destination device through the backup router, rather than the active router. As the originating device receives the ARP response via the backup router after the ARP response via the active router, the originating device may end up configuring a route to send network traffic bound for the destination device via a sub-optimal route through the backup router as this backup route may have a greater cost and/or latency than an active route through the active router.

In general, the disclosure describes techniques for forwarding network traffic via an active or primary router rather than through a backup or standby router despite either the active router or backup router or both the active router and the backup router forwarding an ARP request to the destination router. In one example, a device, such as a destination router, may receive an ARP request from a first network device, which may be an active network device such as a router. The device may also receive an ARP request from a second network device, which may be a backup network device such as a router. The device may send an ARP response to the active network device and the device may refrain from sending an ARP response to the backup network device. The active network device, the backup network device, and the device may be session-based routers and may use unidirectional sessions.

The techniques of the disclosure may provide specific improvements to the computer-related field of computer networking that have practical applications. For example, the techniques disclosed herein may enable an originating device to ensure the forwarding of network traffic to a destination device via an active route (e.g., a least cost route) rather than via a backup route (e.g., a higher cost route), even when the destination router receives an ARP request from the backup router, thereby improving traffic latency and network efficiency.

In one example, this disclosure describes a device comprising one or more processors and memory coupled to the one or more processors, the memory storing instructions that upon execution cause one or more processors to: receive a first address resolution protocol (ARP) request from an active network device and a second ARP request from a backup network device; and in response to receiving the first ARP request and the second ARP request, send a first ARP response to the active network device.

In another example, this disclosure describes a method comprising: receiving, by a device, a first address resolution protocol (ARP) request from an active network device and a second ARP request from a backup network device; and in response to receiving the first ARP request and the second ARP request, sending, by the device, a first ARP response to the active network device.

In another example, this disclosure describes a non-transitory computer-readable storage medium storing instructions, which, when executed, cause one or more processors to: receive a first address resolution protocol (ARP) request from an active network device and a second ARP request from a backup network device; and in response to receiving the first ARP request and the second ARP request, send a first ARP response to the active network device.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
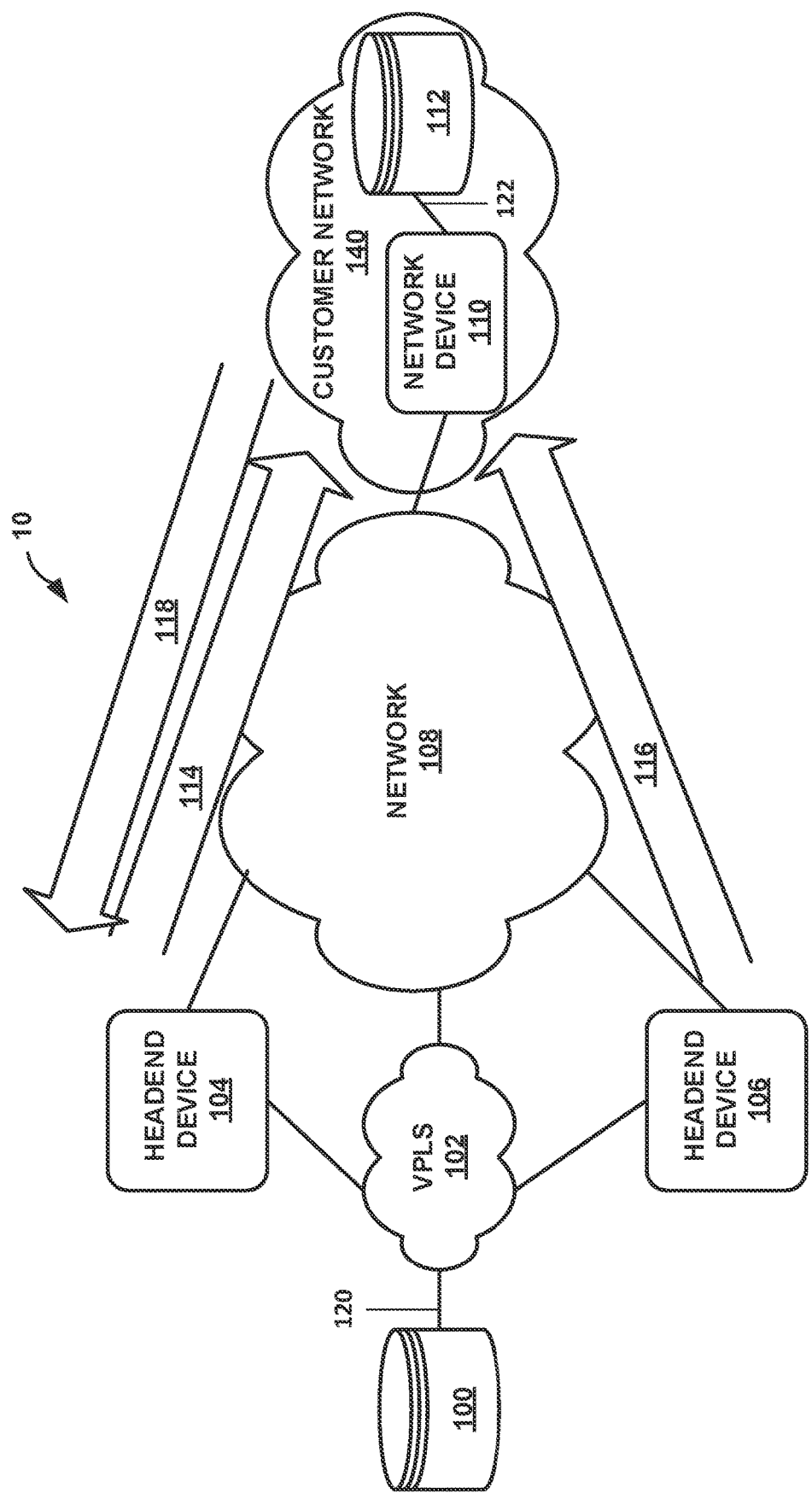
FIG. 1 is a block diagram illustrating an example computer network system in accordance with the techniques of the disclosure.

FIG. 1 is a block diagram illustrating an example network system according to the techniques of this disclosure. Network system 10 includes client device 100 and client device 112. Client device 100 may be a broadcast device, a unicast device, a multicast device, or the like, and may be configured to forward broadcast, unknown unicast, and multicast (BUM) traffic to client device 112. Client device 112 may be a device that may be configured to receive network traffic from client device 100. Client device 100 may be communicatively coupled to virtual private local area network service (VPLS) 102. VPLS 102 may be communicatively coupled to headend device 104 and to headend device 106. Headend device 104 and headend device 106 may include session-based routers. In the example of FIG. 1, headend device 104 may be an active or primary network device and headend device 106 may be a backup or secondary network device providing redundancy for network traffic flowing from client device 100 to client device 112 in case headend device 104 goes down or connectivity between client device 100 and client device 112 via headend device 104 is lost.

Each of headend device 104 and headend device 106 may be communicatively coupled to network 108. Although not depicted, network 108 may include network devices, such as, for example, routers, switches, gateways, bridges, hubs, servers, firewalls or other intrusion detection systems (IDS) or intrusion prevention systems (IDP), computing devices, computing terminals, printers, other network devices, or a combination of such devices. Network 108 may be a public network (e.g., the Internet), an enterprise network, such as a branch network, a data center network, a service provider network, an Internet Service Provider network, or other type of network. In some examples, network 108 may be a collection of networks that provide wide area network (WAN) connectivity to client device 100 and client device 112. While the example of FIG. 1 depicts a single client device 112, in some examples, any number of devices may be coupled to network device 110.

In the example of FIG. 1, client devices 100 and 112 may be in L2 computer networks where reference to a layer followed by a number refers to a corresponding layer in the Open Systems Interconnection (OSI) model. L2 is also known as a "data link layer" in the OSI model and the term L2 may be used interchangeably with the phrase "data link layer" throughout this disclosure. Typically, customer networks, e.g., customer network 140, include many client devices, such as device 112, each of which may communicate across network 108 with other devices, such as device 100. Link 120 and link 122 may be Ethernet, Asynchronous Transfer Mode (ATM), wireless local area network (WLAN), or any other suitable network connections. In some examples, client device 100 and client device 112 may be connected via a virtual local area network (VLAN).

Headend device 104, headend device 106, and network device 110 may include routers, such as session-based routers. However, techniques of the disclosure may be implemented using any network device, such as switches, routers, gateways, or other suitable network devices that may send and receive network traffic.

Customer network 140 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers not depicted in FIG. 1. The configuration of network system 10 illustrated in FIG. 1 is merely an example. For example, network system 10 may include any number of networks or network devices.

In some examples, network 108 represents one or more publicly accessible computer networks that are owned and operated by one or more service providers. Although network system 10 is illustrated in the example of FIG. 1 as including a single network 108, in other examples network system 10 may alternatively include multiple service provider networks that provides connectivity between client device 100 and client device 112. A service provider is usually a large telecommunications entity or corporation. A service provider network is usually a large L3 computer network. As such, network 108 may be an L3 network in the sense that network 108 natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although additional devices are not shown for ease of explanation, it should be understood that network system 10 may include additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers.

A service provider network typically provides a number of residential and business services for customer networks, such as customer network 140, including residential and business class data services (which are often referred to as "Internet services" in that these data services permit access to the collection of publicly accessible networks referred to as the Internet), residential and business class telephone and/or voice services, and residential and business class television services.

In some examples, headend device 104, headend device 106, and network device 110 may implement a stateful, session-based routing scheme that enables each of headend device 104, headend device 106, and network device 110 to independently perform path selection and traffic engineering. The use of session-based routing may enable network device 110 to eschew the use of a centralized controller, such as a Software-Defined Networking (SDN) controller to perform path selection and traffic engineering. In this way, routers such as headend device 104, headend device 106, and network device 110, may be more efficient and scalable for large networks where the use of an SDN controller would be infeasible. Furthermore, the use of session-based routing may enable headend device 104, headend device 106, and network device 110 to eschew the use of tunnels, thereby saving considerable network resources by obviating the need to perform encapsulation and decapsulation at tunnel endpoints. In some examples, headend device 104, headend device 106, and network device 110 implement session-based routing as Secure Vector Routing (SVR), provided by Juniper Networks, Inc. With SVR, when receiving an L2 packet from a virtual local area network (VLAN), such as VPLS 102, headend device 104 or headend device 106 may encapsulate L2 address information within an L3 header to carry L2 address information over an L3 network, such as network 108. Such a packet may include metadata including a MAC address of a device in an L2 network, such as network device 110, and L3 information identifying the session. In some examples, headend device 104, headend device 106, and network device 110 include session-based routers, such as Ethernet over SVR (EoSVR) routers.

In the example of FIG. 1, client device 100 may establish a session with client device 112. Headend device 104, headend device 106, and network device 110 may facilitate establishment of the session by transporting network traffic between client device 100 and client device 112. In some examples, client device 100 may be considered a "source" device in that client device 100 originates a session from client device 100 to client device 112, e.g., client device 100 is the "source" of a packet of a forward flow of the session. In some examples, the session includes a forward packet flow originating from client device 100 and destined for client device 112.

In some examples, headend device 104, headend device 106, and network device 110 may enable the extension of customer network 140, an L2 network, across network 108, e.g., L3 networks, to VPLS 102, another L2 network. VPLS 102 may provide any-to-any (e.g., multipoint to multipoint) communication over Internet Protocol/Multi-Protocol Layer Switching (MPLS) (e.g., to carry Ethernet L2 packets of virtual private networks over MPLS L3—e.g., to integrate an L2 network with an L3 network). While the example of FIG. 1 discusses VPLS 102, the techniques of this disclosure may be used with any L2 network.

In the example of FIG. 1, when headend device 104 or headend device 106 receives a packet for the forward packet flow originating from client device 100 and destined for client device 112, headend device 104 or headend device 106 may determine whether the packet belongs to a new session (e.g., is the "first" packet or "lead" packet of a session). In some examples, headend device 104 or headend device 106 may determine whether a source address, source port, destination address, destination port, and protocol of the first packet matches an entry in a session table.

If no such entry exists, headend device 104 or headend device 106 may determine that the packet belongs to a new session and creates an entry in the session table. Furthermore, if the packet belongs to a new session, headend device 104 or headend device 106 may generate a session identifier for the session. The session identifier may comprise, e.g., a source address and source port of client device 100, a destination address and destination port of client device 112, and a protocol used by the first packet. Headend device 104 or headend device 106 may use the session identifier to identify subsequent packets as belonging to the same session.

In some examples, headend device 104 or headend device 106 may perform stateful routing for the session. For example, headend device 104 or headend device 106 may forward each packet of the forward packet flow of the session sequentially and along the same forward network path. As described herein, the "same" path may mean the same routers that form a segment or at least a portion of the path between a device originating the packet (e.g., client device 100) and a device to which the packet is destined (e.g., client device 112), but not necessarily the entire network path between the device originating the packet and the device to which the packet is destined. By ensuring that each packet of a flow is forwarded sequentially and along the same path, headend device 104 or headend device 106 maintains the state of the entire flow, thereby enabling the use of stateful packet services, such as Deep Packet Inspection (DPI).

More information on session-based routing may be found in U.S. patent application Ser. No. 17/357,790, filed on Jun. 24, 2021, and entitled "LAYER-2 NETWORK EXTENSION OVER LAYER-3 NETWORK USING LAYER-2 METADATA, the entire content of each of which is incorporated herein by reference in its entirety.

In traditional network systems, both headend device 104, which may be an active router (e.g., headend device 104 may have a lowest cost path to network device 110), and headend device 106, which may be a standby or redundant router (e.g., headend device 106 may have a higher cost path to network device 110 than headend device 104), send address resolution protocol (ARP) requests to network device 110. This may occur because VPLS 102 may not take into account whether headend device 104 or headend device 106 is an active or a standby router for network device 110. For example, client device 100, via VPLS 102, may send ARP requests to both headend device 104 and headend device 106. ARP may be used to discover a media access control (MAC) address of a device from an internet protocol (IP) address. ARP may also be used to convert IP addresses to Ethernet addresses. In a traditional network system, when network device 110 receives ARP requests from both headend device 104 and headend device 106, network device 110 responds in the order in which network device 110 receives the ARP requests. Therefore, assuming network device 110 receives the ARP request from headend device 104 before network device 110 receives the ARP request from headend device 106, network device 110 sends an ARP response to headend device 104 first. If network device 110 receives the ARP request from headend device 106 after receiving the ARP request from headend device 104, network device 110 will send an ARP response to headend device 106 second. Headend device 104 may receive the ARP response prior to headend device 106 receives the ARP response, and thus client device 100 may receive the ARP response from headend device 104 before client device 100 receives the ARP response from headend device 106. Because client device 100 receives the ARP response from headend device 106 after receiving the ARP response from headend device 104, client device 100 may update the routing table of client device 100 to indicate that the route client device 100 should be sending network traffic to client device 112 is through headend device 106 (e.g., the backup router). Client device 100 then may send network traffic to headend device 106 even though headend device 106 is the backup and the route between headend device 106 and network device 110 took longer for traffic to traverse than the route between headend device 104 and network device 110. This may result in a sub-optimal and more expensive route (e.g., the route between headend device 106 and network device 110) being used to carry network traffic. This may increase latency and be wasteful of network resources.

According to the techniques of this disclosure, network device 110 may be configured to send an ARP response to a particular network device (e.g., headend device 104) regardless of which network device from which network device 110 receives an ARP request. For example, network device 110 may be configured to receive a first ARP request 114 from an active network device (e.g., headend device 104) and a second ARP request 116 from a backup network device (e.g., headend device 106). In response to receiving first ARP request 114 and second ARP request 116, network device 110 may send a first ARP response 118 to the active network device. In some examples, network device 110 may be configured to, in response to receiving first ARP request 114 from the active network device and second ARP request 116 from the backup network device, refrain from sending a second ARP response to the backup network device. While this disclosure primarily discusses requests being ARP requests and responses being ARP responses, the techniques of this disclosure may be applied with any type of request to initiate communication and any type of response to the request to initiate communication.

For example, network device 110 may be configured to send ARP responses only to an active or primary router (e.g., headend device 104) and not to the backup or secondary router (e.g., headend device 106) unless the active router is down or communication with the active router is not possible. For example, if network device 110 receives an ARP request from both headend device 104 and headend device 106, network device 110 will only provide the ARP response to headend device 104.

In some examples, network device 110 may be initially configured to determine an active router (e.g., router for low cost path), such as headend device 104 and employ unidirectional session-based routing, such as by network device 110 establishing an L2 session to only headend device 104 (e.g., the active router). When network device 110 determines an active router, network device 110 may save an identifier for the active router, such as a network address, in memory of network device 110. For example, when headend device 104 receives an ARP request from VPLS 102, headend device 104 may send a packet with metadata including L2 session information for unidirectional forward flow (unidirectional flow) to network device 110 to establish a first session and send first ARP request 114 to network device 110. When headend device 106 receives an ARP request from VPLS 102, headend device 106 may send a packet with metadata including L2 session information for forward flow (unidirectional flow) to network device 110 to establish a second session and send second ARP request 116 to network device 110. In response to receiving first ARP request 114, network device 110 may send first ARP response 118 including L2 session information for forward flow (unidirectional flow) to headend device 104 in a third session. For example, network device 110 may determine, based on the L2 session information for the forward flow, the reverse direction from network device 110 to headend device 104 and may establish a session to headend device 104 to send the ARP response. In this way, network device 110 may use the third session to send an ARP response to headend device 104 in response receiving an ARP request from headend device 106. By responding to the ARP request from headend device 106 via the third session to headend device 104, network device 110 may facilitate network traffic from client device 100 to flow through the active router, headend device 104, such as a router of a lower cost path, as client device 100 updates the routing table of client device 100 to indicate that traffic should flow through headend device 104 rather than the less optimal route through headend device 106.

While the example of FIG. 1 is discussed with respect to VPLS 102, the techniques of this disclosure may be applied to any situation where an active and a backup network device may both send requests to initiate communication to another network device, such as network device 110. In some examples, the ARP request may be contained in a packet header.

Figure 2:
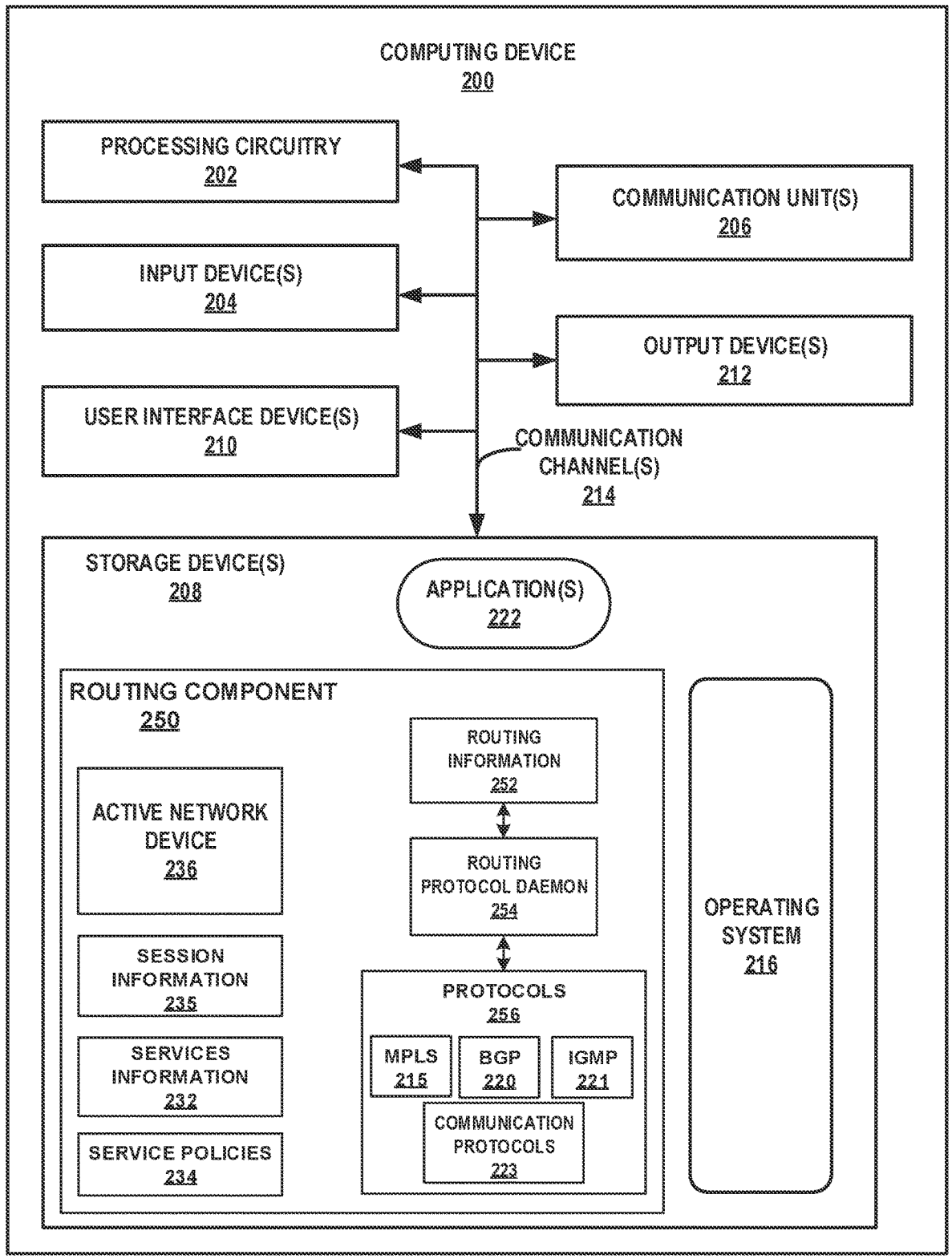
FIG. 2 is a block diagram illustrating an example network device in accordance with the techniques of the disclosure.

FIG. 2 is a block diagram illustrating an example computing device 200 in accordance with the techniques of the disclosure. In general, computing device 200 may be an example implementation of network device 110 of FIG. 1. FIG. 2 illustrates a particular example of a server or other computing device 200 that includes processing circuitry 202 for executing any one or more of applications 222, routing component 250, or any other computing device described herein. Other examples of computing device 200 may be used in other instances.

Although shown in FIG. 2 as a stand-alone computing device 200 for purposes of example, a computing device that operates in accordance with the techniques of this disclosure may be any component or system that includes one or more processors or other suitable computing environment for executing software instructions and, for example, need not necessarily include one or more elements shown in FIG. 2 (e.g., communication unit(s) 206; and in some examples, components such as storage device(s) 208 may not be co-located or in the same chassis as other components). In some examples, computing device 200 may be implemented as a virtualized network function (VNF). In some examples, one or more aspects of computing device 200 can be run as one or more containers or as one or more applications within virtual machines of a Network Functions Virtualization (NFV) platform using, e.g., VirtIO and SRIOV network virtualization technologies, or on bare-metal servers. In some examples, computing device 200 is a physical network device, such as a switch, router, gateway, or other device that sends and receives network traffic.

As shown in the example of FIG. 2, computing device 200 includes processing circuitry 202, one or more input device(s) 204, one or more communication unit(s) 206, one or more output device(s) 212, one or more storage device(s) 208, and one or more user interface (UI) device(s) 210. Computing device 200, in one example, further includes one or more application(s) 222 and operating system 216 that are executable by computing device 200. Each of components 202, 204, 206, 208, 210, and 212 are coupled (physically, communicatively, and/or operatively) for inter-component communications. In some examples, communication channel(s) 214 may include a system bus, a network connection, an inter-process communication data structure, or any other method for communicating data. As one example, components 202, 204, 206, 208, 210, and 212 may be coupled by one or more communication channel(s) 214.

Processing circuitry 202, in one example, is configured to implement functionality and/or process instructions for execution within computing device 200. In some examples, processing circuitry 202 comprises one or more hardware-based processors. For example, processing circuitry 202 may be capable of processing instructions stored in storage device(s) 208. Examples of processing circuitry 202 may include, any one or more of a microprocessor, a controller, a digital signal processor (DSP), an application specific integrated circuit (ASIC), a field-programmable gate array (FPGA), or equivalent discrete or integrated logic circuitry.

One or more storage device(s) 208 may be configured to store information within computing device 200 during operation. Storage device(s) 208, in some examples, may be described as a computer-readable storage medium. In some examples, storage device(s) 208 may include a temporary memory, meaning that a primary purpose of storage device(s) 208 is not long-term storage. Storage device(s) 208, in some examples, may include a volatile memory, meaning that storage device(s) 208 does not maintain stored contents when the computer is turned off. Examples of volatile memories include random access memories (RAM), dynamic random access memories (DRAM), static random access memories (SRAM), and other forms of volatile memories. In some examples, storage device(s) 208 stores program instructions for execution by processing circuitry 202. Storage device(s) 208, in one example, are used by software or applications running on computing device 200 to temporarily store information during program execution.

Storage device(s) 208, in some examples, also include one or more computer-readable storage media. Storage device(s) 208 may be configured to store larger amounts of information than volatile memory. Storage device(s) 208 may further be configured for long-term storage of information. In some examples, storage device(s) 208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 200, in some examples, also includes one or more communication unit(s) 206. Computing device 200, in one example, utilizes communication unit(s) 206 to communicate with external devices via one or more networks, such as one or more wired/wireless/mobile networks. Communication unit(s) 206 may include a network interface, such as an Ethernet card, an optical transceiver, a radio frequency transceiver, or any other type of device that can send and receive information. Other examples of such network interfaces may include 3G and WiFi radios. In some examples, communication unit(s) 206 may include a plurality of high-speed network interface cards. In some examples, computing device 200 uses communication unit(s) 206 to communicate with an external device. For example, computing device 200 uses communication unit(s) 206 to communicate with other routers 110 and/or client devices 100 of FIG. 1 via links 16 of FIG. 1 with which communication unit(s) 206 is connected.

Computing device 200, in one example, also includes one or more user interface device(s) 210. User interface device(s) 210, in some examples, are configured to receive input from a user through tactile, audio, or video feedback. Examples of user interface devices(s) 210 include a presence-sensitive display, a mouse, a keyboard, a voice responsive system, video camera, microphone or any other type of device for detecting a command from a user. In some examples, a presence-sensitive display includes a touch-sensitive screen. In some examples, a user such as an administrator may enter configuration data for computing device 200.

One or more output device(s) 212 may also be included in computing device 200. Output device(s) 212, in some examples, is configured to provide output to a user using tactile, audio, or video stimuli. Output device(s) 212, in one example, includes a presence-sensitive display, a sound card, a video graphics adapter card, or any other type of device for converting a signal into an appropriate form understandable to humans or machines. Additional examples of output device(s) 212 include a speaker, a cathode ray tube (CRT) monitor, a liquid crystal display (LCD), or any other type of device that can generate intelligible output to a user.

Computing device 200 may include operating system 216. Operating system 216, in some examples, controls the operation of components of computing device 200. For example, operating system 216, in one example, facilitates the communication of one or more applications 222 with processing circuitry 202, communication unit(s) 206, storage device(s) 208, input device(s) 204, user interface device(s) 210, and output device(s) 212. Applications 222 may also include program instructions and/or data that are executable by computing device 200.

In some examples, processing circuitry 202 executes routing component 250, which determines routes of received packets and forwards the packets accordingly. Routing component 250 may communicate with other routers, e.g., such as routers 110 of FIG. 1, to establish and maintain a computer network, such as computer network system 2 of FIG. 1, for transporting network traffic between one or more customer devices. Routing protocol daemon (RPD) 254 of routing component 250 may execute software instructions to implement one or more control plane networking protocols 256. For example, protocols 256 may include one or more routing protocols, such as Internet Group Management Protocol (IGMP) 221 and/or Border Gateway Protocol (BGP) 220, for exchanging routing information with other routing devices and for updating routing information base (RIB) 252, Multiprotocol Label Switching (MPLS) protocol 215, and other routing protocols. Protocols 256 may further include one or more communication session protocols, such as TCP, UDP, TLS, or ICMP.

Routing information 252 may describe a topology of the computer network in which computing device 200 resides, and may also include routes through the shared trees in the computer network. Routing information 252 may describe various routes within the computer network, and the appropriate next hops for each route, e.g., the neighboring routing devices along each of the routes. Routing information 252 may be programmed into dedicated forwarding chips, a series of tables, a complex database, a link list, a radix tree, a database, a flat file, or various other data structures.

Session information 235 may store information for identifying sessions. In some examples, session information 235 is in the form of a session table. For example, services information 232 may comprise one or more entries that specify a session identifier. In some examples, the session identifier comprises one or more of a source address, source port, destination address, destination port, or protocol associated with a forward packet flow and/or a reverse packet flow (e.g., in the case of a bidirectional session) of the session. As described above, when routing component 250 receives a packet for a forward packet flow originating from client device 100 and destined for client device 112 of FIG. 1, routing component 250 may determine whether the packet belongs to a new session (e.g., is the "first" packet or "lead" packet of a session). To determine whether the packet belongs to a new session, routing component 250 may determine whether session information 235 includes an entry corresponding to a source address, source port, destination address, destination port, and protocol of the first packet. If an entry exists, then the session is not a new session. If no entry exists, then the session is new and routing component 250 may generate a session identifier for the session and stores the session identifier in session information 235. Routing component 250 may thereafter use the session identifier stored in session information 235 for the session to identify subsequent packets as belonging to the same session.

Services information 232 may store information that routing component 250 may use to identify a service associated with a session. In some examples, services information 232 is in the form of a services table. For example, services information 232 may comprise one or more entries that specify a service identifier and one or more of a source address, source port, destination address, destination port, or protocol associated with the service. In some examples, routing component 250 may query services information 232 with one or more of a source address, source port, destination address, destination port, or protocol of a session for a received packet to determine a service associated with a session. For example, routing component 250 may determine a service identifier based on a correspondence of a source address, source port, destination address, destination port, or protocol in services information 232 to a source address, source port, destination address, destination port, or protocol specified by a session identifier. Routing component 250 may retrieve, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing component 250 may apply, to the packet, the one or more service policies 234 that correspond to the service associated with the packet.

Computing device 200 may store an identifier of an active router in active network device 236. For example, with reference to FIG. 1, computing device 200 may store a network address of headend device 104 as the active router.

In accordance with the techniques of the disclosure, computing device 200 may receive a first ARP request 114 from an active network device (e.g., headend device 104) and a second ARP request 116 from a backup network device (e.g., headend device 106). In response to receiving the first ARP request and the second ARP request, computing device 200 may send a first ARP response 118 to the active network device. For example, network device 110 may be configured to, in response to receiving the first ARP request 114 from an active network device (e.g., headend device 104) and second ARP request 116 from a backup network device (e.g., headend device 106), send a first ARP response 118 to the active network device. In some examples, network device 110 may be configured to, in response to receiving first ARP request 114 from the active network device and second ARP request 116 from the backup network device, refrain from sending a second ARP response to the backup network device.

For example, when computing device 200 receives first ARP request 114 from headend device 104 or headend device 106, computing device 200 may look up the active router in active network device 236. As the active router is headend device 104, computing device 200 may send first ARP response 118 to headend device 104. When computing device 200 receives second ARP request 116 from headend device 106, computing device 200 may look up the active router in active network device 236. As the active router is not headend device 106, computing device 200 may refrain from sending an ARP response to headend device 106. If headend device 104 is down or if connectivity to headend device 104 is lost, computing device 200 will only receive an ARP request from headend device 106. In such a case, network device 110 may send an ARP response to headend device 106.

Figure 3:
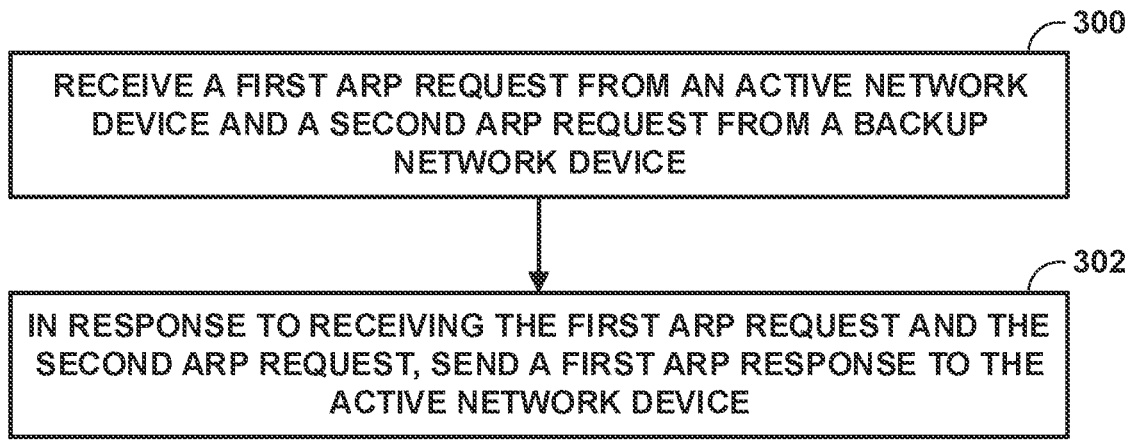
FIG. 3 is a flow diagram illustrating an example operation in accordance with the techniques of the disclosure.

FIG. 3 is a flow diagram illustrating an example operation in accordance with the techniques of the disclosure. While the example of FIG. 3 is described with respect to computing device 200 of FIG. 2, the techniques of FIG. 3 may be performed by other network devices.

Computing device 200 may receive a first ARP request from an active network device and a second ARP request from a backup network device (300). For example, computing device 200 may receive first ARP request 114 from headend device 104 via a first session and may receive second ARP request 116 from headend device 106 (all of FIG. 1) via a second session.

Computing device 200 may, in response to receiving the first ARP request and the second ARP request, send a first ARP response to the active network device (302). For example, computing device 200 may look up which network device is the active network device in active network device 236 (FIG. 2) after receiving first ARP request 114 and second ARP request 116, determine that headend device 104 is the active router, and send first ARP response 118 to headend device 104 based on headend device 104 being the active router.

In some examples, prior to sending the first ARP response, computing device 200 determines that the active network device is the active network device. In some examples, computing device 200 determines that the active network device is the active network device by looking up an identifier of the active network device in the memory (e.g., active network device 236). In some examples, the identifier includes a network address. In some examples, computing device 200 is a session-based router. In some examples, computing device 200 is an Ethernet over secure vector routing device.

In some examples, computing device 200 receives both first ARP request 114 and second ARP request and computing device 200 refrains from sending a second ARP response to the backup network device (e.g., headend device 106).

In some examples, first ARP request 114 is in a first unidirectional session from the active network device (e.g., headend device 104) to network device 110, second ARP request 116 is in a second unidirectional session from the backup network device (e.g., headend device 106) to network device 110, and first ARP response 118 is in a third unidirectional session from network device 110 to the active network device (e.g., headend device 104). In some examples, first ARP request 114 and second ARP request 116 traverse a virtual private local area network service (e.g., VPLS 102) prior to being received by computing device 200.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A device comprising:
   one or more processors;
   memory coupled to the one or more processors, the memory storing instructions that upon execution cause one or more processors to:
      receive a first address resolution protocol (ARP) request from an active network device and a second ARP request from a backup network device;
      in response to receiving the first ARP request, send a first ARP response to the active network device; and
      in response to receiving the first ARP request and the second ARP request, refrain from sending a second ARP response to the backup network device.

2. The device of claim 1, wherein the instructions further cause the one or more processors to:
   prior to sending the first ARP response, determine that the active network device is the active network device.

3. The device of claim 2, wherein the instructions cause the one or more processors to determine that the active network device is the active network device by looking up an identifier of the active network device in the memory.

4. The device of claim 3, wherein the identifier comprises a network address.

5. The device of claim 1, wherein the device comprises a session-based router.

6. The device of claim 1, wherein the first ARP request comprises a request used to establish a first unidirectional session from the active network device to the device, the second ARP request comprises a request used to establish a second unidirectional session from the backup network device to the device, and the first ARP response comprises a request used to establish a third unidirectional session from the device to the active network device.

7. The device of claim 1, wherein the first ARP request and the second ARP request traverse a virtual private local area network service prior to being received by the device.

8. A method comprising:
   receiving, by a device, a first address resolution protocol (ARP) request from an active network device and a second ARP request from a backup network device;
   in response to receiving the first ARP request, sending, by the device, a first ARP response to the active network device; and
   in response to receiving the first ARP request and the second ARP request, refraining, by the device, from sending a second ARP response to the backup network device.

9. The method of claim 8, further comprising:
   prior to sending the first ARP response, determining, by the device, that the active network device is the active network device.

10. The method of claim 9, wherein determining that the active network device is the active network device comprises looking up an identifier of the active network device in memory.

11. The method of claim 10, wherein the identifier comprises a network address.

12. The method of claim 8, wherein the device comprises a session-based router.

13. The method of claim 8, wherein the first ARP request comprises a request used to establish a first unidirectional session from the active network device to the device, the second ARP request comprises a request used to establish a second unidirectional session from the backup network device to the device, and the first ARP response comprises a request used to establish a third unidirectional session from the device to the active network device.

14. The method of claim 8, wherein the first ARP request and the second ARP request traverse a virtual private local area network service prior to being received by the device.

15. A non-transitory computer-readable storage medium storing instructions, which, when executed, cause one or more processors of a device to:
   receive a first address resolution protocol (ARP) request from an active network device and a second ARP request from a backup network device;
   in response to receiving the first ARP request, send a first ARP response to the active network device; and
   in response to receiving the first ARP request and the second ARP request, refrain from sending a second ARP response to the backup network device.

16. The non-transitory computer-readable storage medium of claim 15, wherein the instructions further cause the one or more processors to:
   prior to sending the first ARP response, determine that the active network device is the active network device.

17. The non-transitory computer-readable storage medium of claim 15, wherein the instructions further cause the one or more processors to:
   determine that the active network device is the active network device by looking up an identifier of the active network device in memory.

18. The non-transitory computer-readable storage medium of claim 17, wherein the identifier comprises a network address.

* * * * *